June 17, 1969     P. J. GRAYBILL     3,450,264

METHOD OF AND APPARATUS FOR CLEANING LIQUIDS

Filed Nov. 28, 1967

INVENTOR
P. J. GRAYBILL

BY MARN & JANGARATHIS
ATTORNEYS

June 17, 1969  P. J. GRAYBILL  3,450,264
METHOD OF AND APPARATUS FOR CLEANING LIQUIDS
Filed Nov. 28, 1967  Sheet 2 of 3

United States Patent Office 3,450,264
Patented June 17, 1969

3,450,264
METHOD OF AND APPARATUS FOR CLEANING LIQUIDS
Paul J. Graybill, 61 Sunset Hill Drive,
Pine Orchard, Conn. 06405
Continuation-in-part of application Ser. No. 381,080, July 8, 1964. This application Nov. 28, 1967, Ser. No. 686,055
Int. Cl. B01d 27/02
U.S. Cl. 210—137       16 Claims

ABSTRACT OF THE DISCLOSURE

A method of and apparatus for purifying industrial fluids such as lubricating oil. Impure fluid is caused to flow circularly and laminarly within a vessel containing baffles, a stabilizing foraminous partition, a sludge sump and a reactant for neutralizing acid. The circular, laminar fluid flow in cooperation with gravitational forces, the baffles and reactant, and the availability of a large amount of attractor surface for ionized colloid attraction, facilitate the removal of virtually all dispersed phase contaminants including the coarse or suspended contaminants, colloidal contaminants and emulsified contaminants.

RELATED APPLICATIONS

This application is a continuation-in-part of application Ser. No. 381,080 filed July 8, 1964, now abandoned, for Oil Cleaning Apparatus and Process, which was a continuation-in-part of application Ser. No. 167,848, filed Jan. 22, 1962, for Oil Cleaning Devices, which is now abandoned.

BACKGROUND OF THE INVENTION

One of the basic and long-standing problems facing those concerned with the use of industrial fluids has been that of maintaining the fluids in a pure state so as to reduce the requirement for or frequency of replacement and to maintain the fluids at or near their optimum operational purity. In the field of lubricating oils, for example, much effort has been expended in attempting to devise a commercially feasible method of purification. Unfortunately, the results of these efforts have been generally unsatisfactory.

An analysis of the problems related to the use of the present invention in purifying motor vehicle lubricants is presented hereinafter, although it is to be recognized that the method and apparatus of the present invention are useful for the purification of a broad range of industrial fluids, e.g. fuels, heat exchange fluids and lubricants. The analysis of the invention with respect to this particular utility, i.e. motor vehicle lubricants, is considered to be meaningful in that the problem of impure lubricants is commercially oppressive in the professional automotive industry as well as being one which is quite readily appreciated by the average car owner.

Ever since the advent of the internal combustion engine as a prime mover for motor vehicles, it has been a matter of universal acceptance that periodically, on a regular basis, the engine lubricant must be changed. To the private passenger car owner the inevitable necessity to periodically "change the oil" has come to symbolize the personal inconvenience involved with taking the car to the service station, leaving it there for a period of hours thus being without its use, and then returning to reclaim the car after servicing. To commercial motor vehicle operators, e.g. truckers, car rental services, etc., the necessity to periodically "change the oil" is one measurable in terms of significant operating expenses for oil, "downtime" (the time the vehicle must be out of operation to accomplished the change), personnel and facilities, all of which are identifiable as major cost items. Thus, it can be understood readily that a purifying apparatus and method of purification which can extend the useful life of lubricant, eliminate the necessity for "changing oil" and eliminate the necessity for interrupting the operation of the engine to accomplish purification, will be particularly valuable contributions to motor vehicle owners both commercial and private.

The nature of the contaminants found in the lubricants used in internal combustion engines requires any single purifier to be quite versatile in order to accomplish satisfactory purification. Broadly it may be stated that the dispersed phase contaminants carried in a continuous phase motor vehicle lubricant include: coarse or suspended contaminants, such as dirt and metal particles; colloidal contaminants, such as gums, resins and carbon which are, for the most part, in an ionized state; and, emulsified contaminants such as acid and water. In order for a purifier to effectively purify oil so as to preclude the necessity for "oil changes," it must be capable of removing all or substantially all of these dispersed phase contaminants.

As noted above, the problem is a long-standing one and has fostered much research effort. Included in the results of this research have been flow-through filters such as those which are in general use in the automotive industry today, centrifugal purifiers which are in use in many industrial applications, and centrifugal purifiers used in combination with flow-through type filters. Although these devices have greatly advanced the state-of-the-art of oil cleaning and purification, they have fallen far short of being the ultimate solution for a number of reasons.

Considering, initially, the flow-through type filters, these devices operate on the principle that if a fluid carrying dispersed phase contaminants is passed through a porous substance, the contaminants will be separated from the fluid. This principle is true with regard to the larger or coarse, suspended contaminants. As will be discussed in greater detail below, however, the lubricant from an internal combustion engine is contaminated by many more than just the coarse contaminants, and with respect to the remaining contaminants which are smaller, the flow-through type filter has been found to be generally ineffective because the contaminants merely pass through the pores of the filter material. Additionally, it is easy to recognize that as a flow-through type filter continues in use, the very principle of its operation causes the contaminants to fill the pores and the filter to become clogged and after a while, totally ineffective. The net result of using a flow-through type filter, therefore, is that the oil still requires regular changing since only the coarse contaminants are removed by the filter (when it is working), and, additionally, the filter requires periodic replacement because of the above-noted clogging.

Centrifugal type lubricating oil purifiers are in general use in many industrial applications. They include both centrifuge type and swirling fluid type. The utility of the centrifuge type is limited, however, by the facts that they are relatively expensive and, very often, quite delicate because of the balance required to spin the separator apparatus at the necessary speeds. Although purification by a centrifuge is much more efficient than that accomplished by flow-through filters, such devices are relatively expensive and their operators have found that the delicacy of the devices often causes them to be out of service. Thus, the advantages gained by utilizing a more sophisticated device are, in effect, lost because of the delicacy of the apparatus and its tendency to be out of service.

It is easily recognized that such delicate highly sensitive devices are not the answer where it is desirable to mount the purifier permanently in a vibrating environment such as a motor vehicle, so as to purify the lubricant at all times during operation.

The whirling fluid centrifugal devices have been relatively effective for the separation of very coarse contaminants from the continuous phase oils. Their use, however has been accompanied by two basic difficulties, viz. they have been subject to a tendency of the separated contaminants to be reintroduced into the clarified oil in response to any shocks or jostling. In attempting to overcome the first difficulty, it has been proposed that the centrifugal devices be used in conjunction with ordinary flow-through type filters. While this has had the effect of further cleaning the oil, it has also had the effect of reintroducing a flow-through filter into the system with its attendant disadvantages as noted above. The latter difficulty, i.e. the reintroduction of previously separated contaminants, has heretofore not been satisfactorily overcome and has virtually precluded the consideration of whirling fluid type centrifugal purifiers for use in non-stable environments such as on motor vehicles.

It is the object of the present invention, therefore, to provide a method of and apparatus for purifying a contaminated fluid such as motor vehicle lubricating oil, during the operation of the equipment being serviced, which purification includes the complete or substantially complete removal of dispersed phase contaminants including the coarse, colloidal and emulsified contaminants, without requiring the use of flow-through type filters.

SUMMARY OF THE INVENTION

This object and others which will become more readily apparent are accomplished by a method for separating dispersed phase contaminants from a continuous phase fluid contained in a vessel according to the present invention, which may include the steps of establishing a generally whirling, laminar flow of the fluid in one portion of the vessel so as to cause the dispersed phase contaminants to be displaced radially outwardly from the axis of fluid rotation and generally downwardly through the whirling laminar flow of fluid, separating the displaced dispersed-phase contaminants from the whirling laminar flow of fluid, and collecting the separated dispersed phase contaminants by sedimentation so as to facilitate their removal from the vessel.

An apparatus for practicing the novel method of the present invention may include a fluid-tight vessel, means mounted within the fluid-tight vessel for imparting a whirling laminar flow to fluid in said vessel, and means for retarding the whirling laminar flow of fluid in said vessel, the retarding means defining a space in said vessel for collecting separated contaminants.

BRIEF DESCRIPTION OF THE DRAWINGS

The method and apparatus of the present invention will be more clearly understood from a consideration of the following detailed description when read in the light of the accompanying drawing wherein.

DETAILED DESCRIPTION

Figure 1:
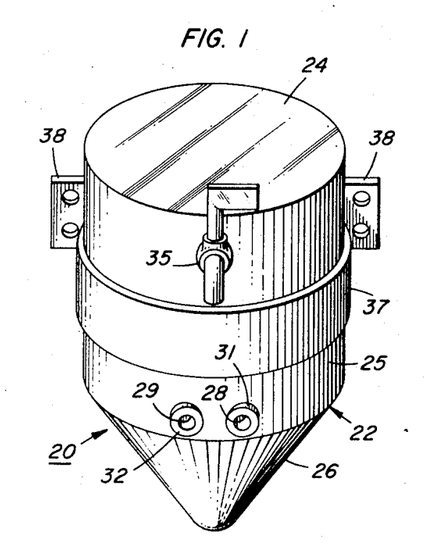
FIG. 1 is a front elevational perspective view of a fluid purifier according to the present invention.
Figure 2:
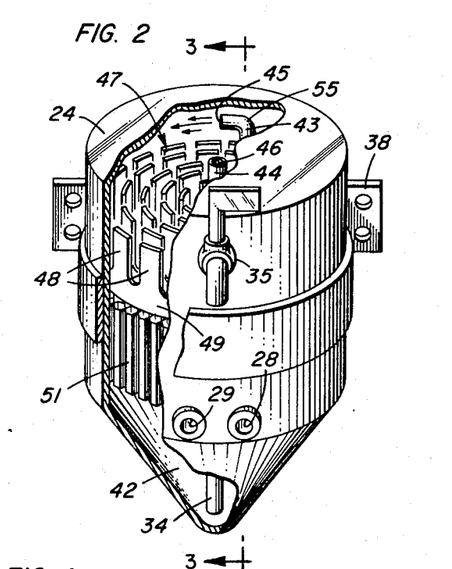
FIG. 2 is a view similar to that of FIG. 1, but being partly cut away to show the inner structure of one embodiment of an apparatus according to the present invention.
Figures 3, 4:
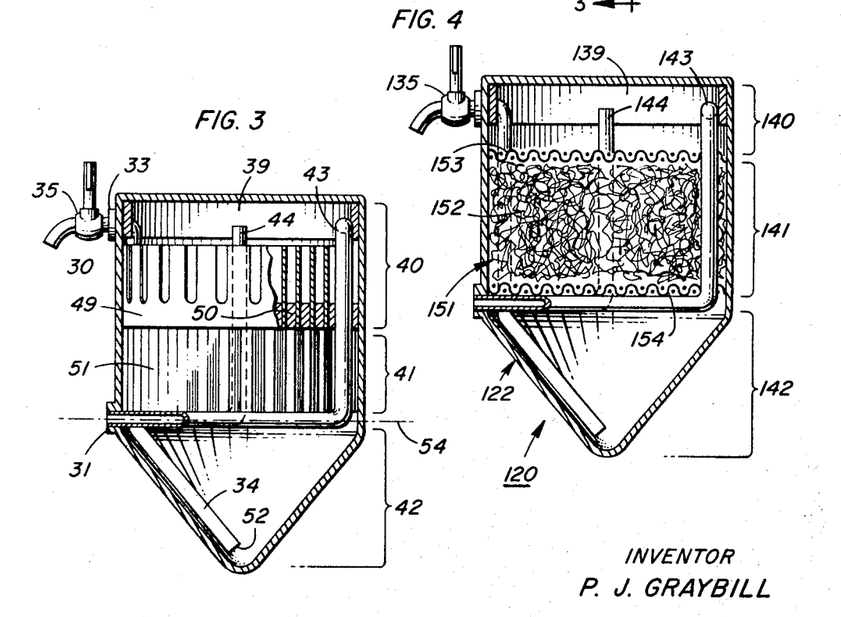
FIG. 3 is a cross-sectional elevational view through the plane 3—3 of FIG. 2.
FIG. 4 is a cross-sectional elevational view similar to FIG. 3, but of another embodiment of apparatus according to the present invention.

Referring now to FIGS. 1–3, there is shown a fluid purifier according to the present invention and designated generally by the reference numberal 20. Purifier 20 is specifically constructed for use as a lubricating oil purifier for motor vehicles.

Purifier 20 comprises a main housing 22 having a top 24, a generally cylindrical body 25, and a conical lower portion 26 depending from body 25. The top 24, body 25 and lower portion 26 of main housing 22 are rigidly secured together, such as by welding to render main housing 22 a unitary fluid-tight structure.

Adjacent the lower edge of cylindrical body 25 are apertures 28, 29 in which are rigidly mounted bosses 31 and 32, respectively. Bosses 31 and 32 are for accommodating the mounting of inlet and outlet oil lines as will be further discussed. Generally above bosses 31 and 32, and adjacent the upper edge of cylindrical body 25, is an aperture 30 for receiving a boss 33 therein. Boss 33 accommodates the connection of a sludge sump drainage line 34 to a bibcock 35 for removing sludge from the purifier 20.

A generally cylindrical mounting strap 37 is provided around the outer surface of cylindrical body 25. Mounting strap 37 is provided with flanges 38 having bolt holes therein so as to suitably mount the purifier 20 in the engine compartment of the motor vehicle near the engine. It is to be understood that mounting strap 37 is shown by way of illustration only, and that purifier 20 may be mounted for operation by many other known mounting techniques.

As can be best seen in FIGS. 2 and 3, the interior of housing 22 is provided with internal fittings, as will be discussed, the effect of which are to define three distinct operational areas, viz. a sweep chamber 40, a sedimentation area 41 and a sludge sump 42. Contained in sweep chamber 40 are the open terminal ends 45, 46 of a contaminated oil inlet line 43 and a pure oil outlet line 44, respectively. Also mounted in sweep chamber 40 are a plurality of concentrically arranged elements comprising a baffle 47 (FIG. 2) which promotes contaminant separation and provides attractor surface for the removal of ionized contaminants as will be discussed. Each baffle 47, as shown, comprises a plurality of vertically extending, generally rectangular prongs 48 mounted on generally cylindrical ring 49. The rings 49 are maintained in spaced concentric relationship by a plurality of suitable spacers 50 (FIG. 3).

There may also be provided in sweep chamber 40 a waster sleeve 39 (FIG. 3) made of suitable material for reacting with and neutralizing acids. Such materials are generally known in the art and may include any one of many magnesium alloys, the magnesium being the reactive material. The sleeve 39 is of an outside diameter substantially equal to the inside diameter of cylindrical body 25. Accordingly, for purposes of manufacture, the sleeve is mounted within the body 25 and rigidly secured in place, such as by welding.

Directly below sweep chamber 40 medially of housing 22, is a sedimentation area 41 wherein is mounted a foraminous partition 51 extending horizontally across the full area of sedimentation area 41. Foraminous partition 51 may be a generally honeycomb-type structure having vertically extending foramina as shown in FIGS. 2 and 3, or it may be any of the other types disclosed in this specification with respect to the other embodiments of apparatus according to the invention, or their equivalents. As will be discussed in greater detail with respect to the operation of these embodiments, the foraminous partitions disclosed are structured so as to interrupt the circular current of fluid in sweep chamber 40 and establish relatively current-free bodies of fluid in the sedimentation area 41 and sludge sump 42. The provision of current-free bodies of fluid in this manner facilitates the removal of dispersed phase contaminants from the flowing continuous phase oil in the sweep chamber as the contaminants are being separated from the oil, as will be discussed. Also a function of the foraminous partition is to provide additional attractor surface, supplementing that provided by baffle elements 47.

Below foraminous partition 50 is sludge sump 42 wherein are collected the separated contaminants (sludge) after they have been separated from the oil in the sweep chamber and removed from the sweep chamber through the sedimentation area 41. Sludge sump 42, as noted above, is generally conical in shape, the wall inclining inwardly and downwardly. The inclination of the walls causes a concentration of sludge in the immediate vicinity of the terminal opening 52 of sludge sump drainage line 34. Further, by maintaining a distinct separation between sludge sump 42 and sweep chamber 40, foraminous partition 51 precludes the reintroduction of contaminants back into sweep chamber 40 once they have been separated, notwithstanding the occurrence of shocks and other jostling which are incidental to a vibratory environment such as an operating motor vehicle.

Contaminated oil inlet line 43 and pure oil outlet line 44 extend into housing 22 from bosses 31, 32 with their respective longitudinal center lines contained in an imaginary, horizontal plane 54 which separates the sludge sump 42 from the sedimentation area 41. Oil inlet line 43 extends from boss 31, chordally across the inner area of body 22 and thereafter upwardly, adjacent the inner wall surface of body 22, through sedimentation area 41 into sweep chamber 40. Adjacent the intersecting inner surfaces of the top 24 and cylindrical body 25 of housing 22, inlet oil line 43 is provided with a bend 55 so as to position inlet orifice 45 in such a manner that oil discharging therefrom is directed tangentially with respect to the inner surface of cylindrical body 25.

Pure oil outlet line 44 extends coaxially vertically along the longitiudinal center line of body 25 from a point just below the inner surface of housing top 24, downwardly through sweep chamber 40 and sedimentation area 41 to imaginary plane 54. From this point, outlet line 44 turns to extend radially outwardly toward boss 32, to which it is securely attached.

It is to be noted that those portions of inlet and outlet lines 43, 44 which are contained in imaginary plane 54, may serve to support foraminous partition 51 which in turn may support baffle elements 47. Alternatively, the foraminous partition 51 and baffle elements 47 may be secured directly to the inner surface of body 25, or to angle supports or the like (not shown).

The operation of the purifier of FIGS. 1–3 is as follows. The purifier 20 is suitably mounted by strap 37 and flanges 38, adjacent the engine of a motor vehicle to be serviced. Thereafter, the purifier 20 is suitably operatively attached in series to the oil system, for example, between the discharge side of the lubricating oil pump and the admission point of lubricating oil to the engine, by suitably connecting oil lines at the inlet and outlet bosses 31, 32. Oil is then allowed to flow into the purifier until the purifier is completely filled and, at this point the system is ready for operational purification.

The contaminated incoming oil is pumped from the engine into purifier 20, through inlet line 43 and into sweep chamber 40 through inlet orifice 45. Orifice 45 directs the incoming oil in a tangential manner with respect to the inner surface of waster sleeve 39 and, as such, accomplishes two distinct flow conditions. First, the discharge of oil into the already full sweep chamber tends to cause all the oil in the sweep chamber to whirl within the chamber, thus establishing a whirling flow condition. Secondly, the discharge velocity of the incoming oil is substantially greater than the whirl velocity of the oil in the chamber thus causing a laminar flow condition between the incoming oil and the contained oil.

The net effect of the two flow conditions is the generation of forces within the flowing oil which tend to separate the coarse contaminants and emulsified water from the continuous phase oil. More specifically, the whirling flow of the oil generates centrifugal forces which displace the coarse contaminants and emulsified water radially outwardly from the center of the sweep chamber 40. The laminar flow condition, which is experienced from oil inlet orifice 45 until the entering oil slows to the ambient whirling velocity of the oil in the chamber, causes the coarse contaminants and emulsified water to be forced outwardly and away from the center or high velocity stream of the flow.

It is also to be recognized that since the purifier 20 is mounted vertically as shown, with sweep chamber 40 above the sedimentation area 41 and the sludge sump 42, gravitational forces are tending to force the dispersed phase contaminants downwardly through the sweep chamber at all times. Thus, it can be seen that the dispersed phase contaminants are subjected to three distinct forces in the sweep chamber, viz. the centrifugal force tending to move the contaminants radially outwardly, the laminar flow force tending to move contaminants away from the high velocity portion of the laminar stream, and the gravitational force tending to move the contaminants downwardly. The cumulative effect of these forces is a resultant force tending to move the dispersed phase contaminants outwardly and downwardly. Thus, the most impure oil in sweep chamber 40 is along the outer lower circumference and the purest oil is at the upper center. It is for this reason that the most desirable location for oil outlet orifice 46 is at the upper center portion of the sweep chamber, as shown.

The magnitudes of the centrifugal flow and laminar flow forces are relatively high and are sufficient to separate substantially all the coarse contaminants and emulsified water from the oil as it passes through the purifier. Obviously the magnitude of the respective forces is determined by the velocity of whirl in the chamber and the relative velocity of the laminar stream with respect to the ambient velocity of whirl. In this regard, it has been found that for the average motor vehicle engine purifier, an inlet oil velocity at the inlet orifice of approximately 140 miles per hour is fully satisfactory. It is to be understood, however, that this velocity may vary depending upon the particular application and the nature of the contaminants separated from the oil.

As the coarse contaminants and emulsified water are forced outwardly, they are caused to impinge upon the prongs 48 of baffle elements 47, or upon the inner surface of waster sleeve 39. Continued impingement of the contaminants causes a build-up on the respective prongs or on the sleeve, which build-up continues until the mass of the collected contaminants is sufficiently great to cause the contaminants to slide down the surface of the prong, as sediment, into the sedimentation area 41 and ultimately into sludge sump 42. The downward movement of the collected contaminants on the radially inner surfaces of the prongs is retarded to a certain degree by the centrifugal forces in the sweep chamber 40 which tend to force the contaminants against the prongs 48 or sleeve 39. Movement of the collected contaminants on the outer surfaces of the prongs, however, is enhanced by the eddy currents formed around the prongs by the swirling fluid. Once the downwardly sliding contaminants enter the sedimentation area, however, the whirling flow of the oil is dampened by foraminous partition 51 thereby allowing the contaminants to settle relatively freely downwardly.

After the contaminants have passed through the sedimention area 41 and foraminous partition 51, they are collected, as sediment, within sludge sump 42 which contains a relatively still body of oil due to its being separated from sweep chamber 40 by foraminous partition 51. The capacity of the oil in the sump 42 to receive the downwardly settling sediment is enhanced by the heating effect of the hot oil passing through inlet and outlet lines 43 and 44. Thus, as the hot inlet oil and hot outlet oil pass through their respective lines, the lines 43, 44 act as heat exchanger tubes and heat the sump oil thereby decreasing its viscosity so as to allow the more rapid passage of separated contaminants downwardly into the sludge sump for removal.

The emulsified acids contained in the contaminated inlet oil are removed by a chemical reaction with magnesium waster sleeve 39. More specifically, as the oil in the sweep chamber 40 whirls within magnesium waster sleeve 39, the emulsified acids which contact the sleeve react with the magnesium to form magnesium salts which precipitate downwardly into sludge sump 42 as sediment.

The removal of colloidal contaminants is accomplished in either of two ways, depending upon whether the oil being used is detergent or non-detergent. Considering initially non-detergent oil, the colloidal contaminants found in used non-detergent oil are, for the most part, ionized carbon colloids. The very fact that they are colloids precludes their efficient separation by centrifugal action. On the other hand, the fact that they are ionized facilitates their removal by the method and apparatus of the present invention. More specifically, it was noted above that baffle elements 47 and foraminous partition 51 provide attractor surface for the removal of ionized contaminants. Thus, the baffle elements 47 and foraminous partition 51, provide a large amount of surface area which is exposed to the oil in the purifier so as to enhance the likelihood that ionized contaminants will contact the attractor surfaces thereby causing an electrostatic bond between the surfaces and the particles. The ionized contaminants which contact and bond with the attractor surfaces, build in thickness and coalesce until the coalescent mass is of such weight and thickness that the force of attraction between the mass and the attractors is insufficient to maintain the bond. At this stage, the coalescent mass begins to slide down the attractor surface, as sediment, until it has passed through the sedimentation area 41 and into sludge sump 42 where it can be discharged.

The removal of colloidal contaminants from detergent oil is rendered relatively easy by the electrolytes contained therein. More specifically, as is known to those skilled in the art, lubricating oil can be made to be detergent oil by adding electrolytes which react with the ionized colloidal contaminants to neutralize them and preclude their bonding to the inner engine surfaces. An additional effect of the reaction, however, is that the neutralized particles are increased in size and mass by an amount which makes them susceptible to separation by the centrifugal and laminar flow forces as described above. Thus, the method and apparatus of the present invention remove the neutralized colloidal contaminants from detergent oil in the same manner as the coarse contaminants and emulsified water are removed. Further, any ionized colloidal contaminants which are not neutralized by the electrolytes are removed in the same manner as described above with respect to the non-detergent oil purification.

It can be seen, therefore, that the method and apparatus of the present invention cause dispersed phase contaminants to be separated from the continuous phase oil and deposited in sludge sump 42, as sediment, for removal. In this regard, removal of the sludge is accomplished by opening bibcock 35 with pressure in the purifier (i.e. with the serviced engine running) and allowing the discharge of a certain amount of the sludge containing oil through sump drain line 34. The amount drained depends upon the oil capacity of the serviced engine, but it has been found that extremely satisfactory results are obtained if approximately one tenth of the crank case capacity is drained after each 1,000 miles of driving. The rate of draining may be varied, however, without departing from the scope of the present invention. Experimentation in actual driving tests has shown that a properly installed purifier according to this invention can keep lubricating oil substantially free of water and acid, and free of all contaminant particles over two microns in size for an indefinite period.

Considering now the other embodiments of apparatus according to the present invention and referring more particularly to FIG. 4, there is shown a second embodiment of purifier according to the present invention, which purifier is designated generally by the reference numeral 120.

Figure 5:
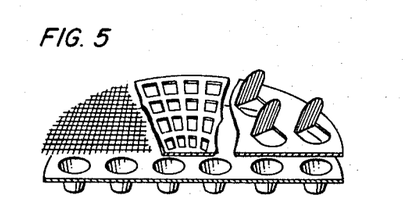
FIG. 5 is a composite view, partially cut away, of separator elements which may be utilized in apparatus according to the present invention.

As was the case with the purifier 20 of FIGS. 1–3, purifier 120 comprises a housing 122, the inner portion of which is operationally divided into a sweep chamber 140, a sedimentation area 141 and a sludge sump 142. Oil inlet and outlet lines 143 and 144, as well as a sump drainage line 134 with a bibcock 135 are provided in the same manner as described with respect to the embodiment of FIGS. 1–3. Additionally, a magnesium ring 139 is mounted in sweep chamber 140. The embodiment of FIG. 4 differs from that of FIGS. 1–3 in the structure of formaminous partition 151 and in the absence of baffle structure extending into sweep chamber 140. Thus, it can be seen from FIG. 4 that foraminous partition 151 comprises a wire mesh attractor 152 mounted between an upper screen 153 and a lower screen 154. The screens 153, 154 may be hardware cloth, or they may be stamped plate such as the separator elements shown in composite in FIG. 5, or they may be any other material capable of positioning wire mesh 152. As was the case with the embodiment of FIGS. 1–3, lower screen 154 may support the partition by resting on oil inlet and outlet lines 143, 144, or the partition may be independently supported such as by securing to the inner surface of housing 122.

It is to be recognized that a prime function of the foraminous partition is to separate the sludge-containing oil in the sump 142 from the oil in sweep chamber 140. This in addition to the desirability that as much attractor surface as possible be available suggests that any foraminous partition which can preclude reintroduction of sludge from sump 142 to chamber 140 in response to jostling will be satisfactory so long as adequate attractor area is available to facilitate the collection and removal of ionized contaminants. Thus, a purifier for use with detergent oil wherein the incidence of ionized contaminants is far less than that associated withe non-detergent oil, may well be without baffle elements without causing any significant reduction in effectiveness. On the other hand, the more attractor surface available, the better the purification.

The operation of the apparatus of FIG. 4 is exactly the same as that discussed with respect to the embodiment of FIGS. 1–3 except for the nature of the downward displacement of the separated contaminants. As can be readily seen from FIG. 4, contaminants in this embodiment will be deposited on waster sleeve 139, the inner surface of housing 122, or on the wire threads of foraminous partition 151. Thus, downward displacement must be through the wire mesh rather than through honeycomb. In all other respects, the operation is identical.

Figure 6:
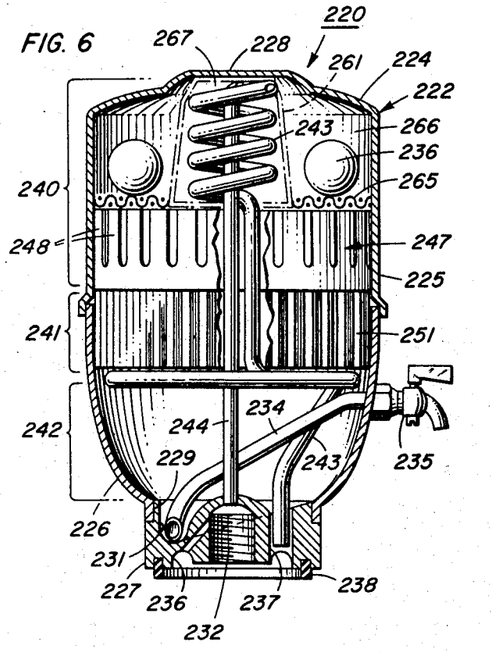
FIG. 6 is a front, cross-sectional, elevational view of yet another embodiment of apparatus according to the present invention.

Referring now to FIG. 6, there is shown another embodiment of fluid purifier according to the teaching of the present invention, designated generally by the reference numeral 220. Purifier 220 is a partial flow purifier, i.e. all the system oil is not circulated through the purifier as part of the cycle, and is somewhat more sophisticated than the purifier embodiments 20, 120 of FIGS. 1–4, however, the principles of operation and contaminant separation are exactly the same.

More particularly, purifier 220 comprises a housing 222 having a top 224, an upper body portion 225, a lower body portion 226 and a mounting plug 227. The top 224 and upper body portion 225 are a unitary structure, top 224 being provided with an upwardly projecting cup-shaped section to define an anti-drain back chamber 228 as will be discussed. Lower body portion 226 is generally cylindrical in shape and is rigidly secured, as by welding, along its upper edge to the upper body portion 225. An annular socket 229 is provided in the lower end of lower body portion 226 for telescopically receiving a mounting plug 227, which plug, when inserted in socket 229, is rigidly secured to the lower body portion 226, such as by welding.

Similarly to the above-described embodiments, purifier 220 comprises three basic operational areas, viz. a sweep chamber 240, a sedimentation area 241 and a sludge sump 242. Sludge sump 242 is bottomed by mounting plug 227 which is formed to include a sludge trap 231, a centrally disposed threaded outlet opening 232 and an annular inlet race 236 which opens in a passage 237 for receiving the internal oil inlet line 243. The lower edge of mounting plug 227 is provided with an annular sealing element 238. Thus, as can be recognized by those skilled in the art, mounting plug 227 facilitates the mounting of purifier 220 directly on the standard mounting for conventional flow through filters.

Figure 8:
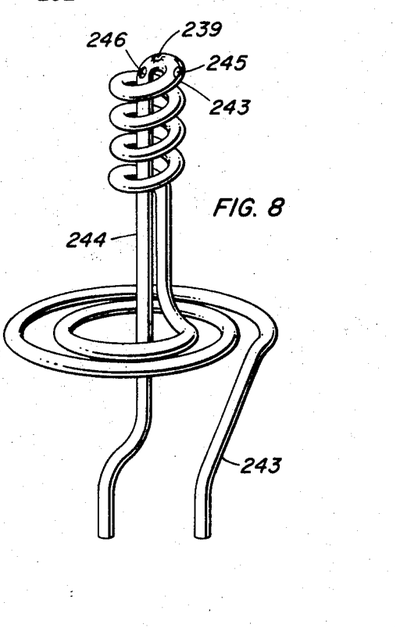
FIG. 8 is a front perspective view of the inlet and outlet piping used in the embodiments of FIGS. 6 and 7.
Figure 9:
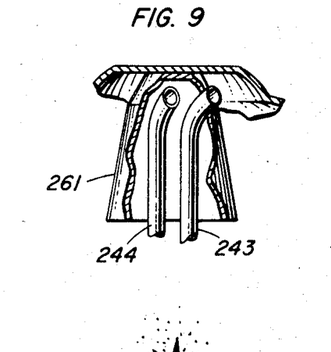
FIG. 9 is a partial, front elevational cross-sectional view of inlet and outlet orifices structure which may be used in place of the helical bend structure of FIG. 8.

As may be best seen in FIGS. 6 and 8, oil inlet line 243 extends from the passage 237 upwardly within sludge sump 242 wherein it is provided with a horizontally oriented inwardly progressing volute portion which acts as a heat exchange device for heating the oil in sludge sump 242. Thereafter, inlet line 243 extends upwardly by an amount sufficient to allow passage through a foraminous partition 251 and baffle sections 247 as will be discussed. Above baffle sections 247, inlet line 243 is provided with a plurality (four shown) of helical turns which extend upwardly to the underside of cup-shaped section 228 of housing top 224. At the underside of cup-shaped section 228, inlet line 243 becomes outlet line 244 and extends downwardly along the geometric center of the purifier 220, through sweep chamber 240, sedimentation area 241 and sludge sump 242 to the outlet opening 232 in mounting plug 227.

Figure 10:
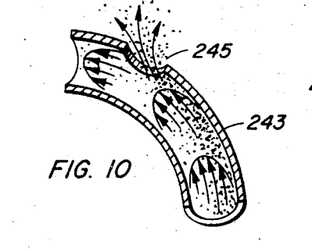
FIG. 10 is a partial, cross-sectional view of the inlet orifice and inlet pipe at the helical bend of the structure of FIG. 8.

Referring to FIGS. 8 and 10, it can be seen that the helical bends in inlet line 243 serve to establish a circular flow path in the inlet oil thus generating centrifugal forces within the inlet line, which supplement the existing laminar flow forces and tend to displace the coarse contaminants radially outwardly. The uppermost helix is provided with a discharge orifice 245 and return orifice 246, separated by a pinched or reduced area portion 239. Discharge orifice 245 is formed in the radially outside wall of inlet line 243 and opens through a suitable aperture 260 in cup-shaped flow separator 261. Return orifice 246 is positioned within cup-shaped flow separator 261 at the uppermost portion of the line and along the vertical centerline of purifier 220. The pinched or reduced area portion 239 forms a flow restrictor which dictates the flow balance of fluid which is passed directly through the restrictor and that which is forced out of orifice 245, into purifier 220, and back into the system through orifice 246.

Flow separator 261 is a frusto-conical element having an open end disposed adjacent the upper portions of prongs 248, and a closed upper end secured to the inner surface of anti-drainback chamber 228. The conical wall of flow separator 261 divides sweep chamber 240 into an outer chamber 266 and an inner chamber 267.

Mounted in sedimentation area 241 is a honeycomb-type foraminous partition 251 which is the same as that discussed with respect to the embodiment of FIG. 1. Additionally, above foraminous partition 251 is a plurality of baffle elements 247 having upwardly extending prongs 248, which baffle elements are also the same as those discussed with respect to the description of the embodiment of FIG. 1. Provided above prongs 248 is an annular screen 265 which may be secured adjacent the lower edge of flow separator 261 and which may rest on top of prongs 248. Screen 265 extends from the outer surface of flow separator cup 261 to the inner surface of upper body portion 225, and defines a race for supporting a plurality of magnesium balls 236 which are used, in this embodiment, as reaction material for the neutralization of acids, instead of the magnesium waster sleeve discussed before.

Sludge sump 242 is provided with a sludge removal line 234 which extends from sludge trap 231 to a bibcock 235 in the same manner as discussed above with respect to the embodiment of FIG. 1.

In operation, the purifier 220 of FIG. 6 is first mounted on the existing engine connection for a conventional filter, and filled with oil. Thereafter, as the engine is run, oil is pumped into purifier 220 through inlet race 236, passage 237 and upwardly within inlet line 243. As noted above, the oil passing through the toroidal portion of the inlet line serves to heat the oil in the sludge sump 242. As the oil continues upwardly through line 243 it is caused to enter the helical winding wherein the laminar flow of the oil within the line is supplemented by the centrifugal action caused by the circular flow pattern, thereby displacing the coarse contaminants radially outwardly. As the oil passes discharge aperture 245, a portion of the oil is discharged therethrough together with most of the coarse contaminants since the aperture 245 is formed in the radially outer wall of line 243.

Oil which is not passed through aperture 245 continues through flow restrictor 239 to outlet line 244 to be returned to the engine. The oil which is passed through aperture 245 establishes a whirling laminar flow within sweep chamber 240 which, as discussed before, separates the coarse contaminants and emulsified water for sedimentation through the sedimentation area 241 into the sludge sump 242 for removal as required. Separator cup 261 prevents the oil from short-circuiting, and requires that oil which enters the purifier through orifice 245 pass downwardly through outer chamber 266, through baffle elements 247 and thereafter upwardly within inner chamber 267, to be returned to outlet line 244 through return orifice 246. The effect of this forced circulation is to increase the efficiency of contaminant removal, to provide more exposure of the oil to prongs 249, and to provide more exposure of the oil to magnesium balls 236 so as to increase the efficiency of acid removal.

As noted above, acid removal from lubricants has been facilitated by exposing the lubricant containing emulsified acids to a magnesium alloy so that the acid and magnesium will react to form a precipitating salt which can be removed. Although magnesium rings of the type disclosed in the embodiments of FIGS. 1–4 have been generally satisfactory, they have shown a tendency to become coated with free carbon, which coating acts as a reaction inhibitor and decreases their capacity to remove acid. Magnesium balls 236, however, have overcome this difficulty in that as they are caused to spin and rotate by the whirling oil, they engage the inner surface of upper body portion 225 of housing 222 and also the screen race 265. The contact causes a frictional cleaning which has been found to be sufficiently effective to maintain virtually the entire ball surface free of carbon coating and therefore highly reactive. Thus, the use of magnesium balls as disclosed in this embodiment is a distinct improvement over the above-described magnesium rings.

Further, as was noted above, the discharge and return orifices 245, 246 are located at the extreme top of purifier 220 within anti-drainback chamber 228. This location minimizes the drain back of oil from the purifier into the crankcase when the engine is not operating. As will be discussed further, the retention of oil within the purifier at all times is highly effective in stimulating the removal of ionized colloidal contaminants.

Finally as to this embodiment, it is to be noted that purifier 220 is not a full-flow purifier, but rather it purifies only that oil which passes through discharge orifice 245. If a full-flow purifier is desired, however, it may readily be constructed by eliminating the helical bends in inlet line 243, extending the inlet line directly through separator cup 261 and discharging all the oil into the sweep chamber 240. The outlet or return orifice is located adjacent the underside of the top of separator cup 261 and is located on the geometric center of the purifier.

Figure 7:
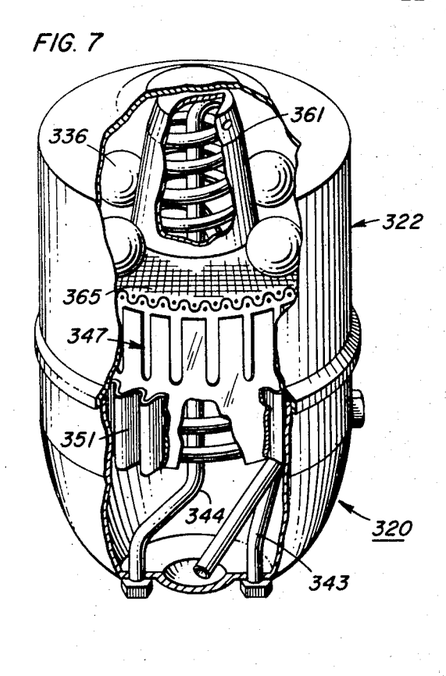
FIG. 7 is a front perspective view, partly cut away, of a still further embodiment of apparatus according to the present invention.

Referring now to FIG. 7, there is shown another embodiment of a purifier according to the teaching of the present invention, designated generally by the reference numeral 320. Purifier 320 is structured exactly the same as the embodiment of FIG. 6 with two exceptions. There is no mounting plug 227, but rather the purifier is adapted for being mounted remote from the engine and connected thereto at bosses 331 and 332 by suitable flexible connectors. Additionally, the foraminous partition 351 and baffle elements 347 are manufactured as a unit to simplify the construction of the device.

More particularly, the honeycomb structure of foraminous partition 351 comprises a plurality of concentrically oriented cylindrical members 349 and a plurality of radially extending members 350 which cooperate to define the vertically extending foramina. In the embodiment of FIG. 7, alternate cylindrical elements 349 are provided with integral upwardly extending prongs 348 which are substantially the same, both structurally and functionally as the prongs 48 of the embodiment of FIGS. 1–3. It can be seen, therefore, that by making the foraminous partition and the baffle elements a unitary structure, many savings can be realized both with respect to assembly and component manufacture.

Figure 11:
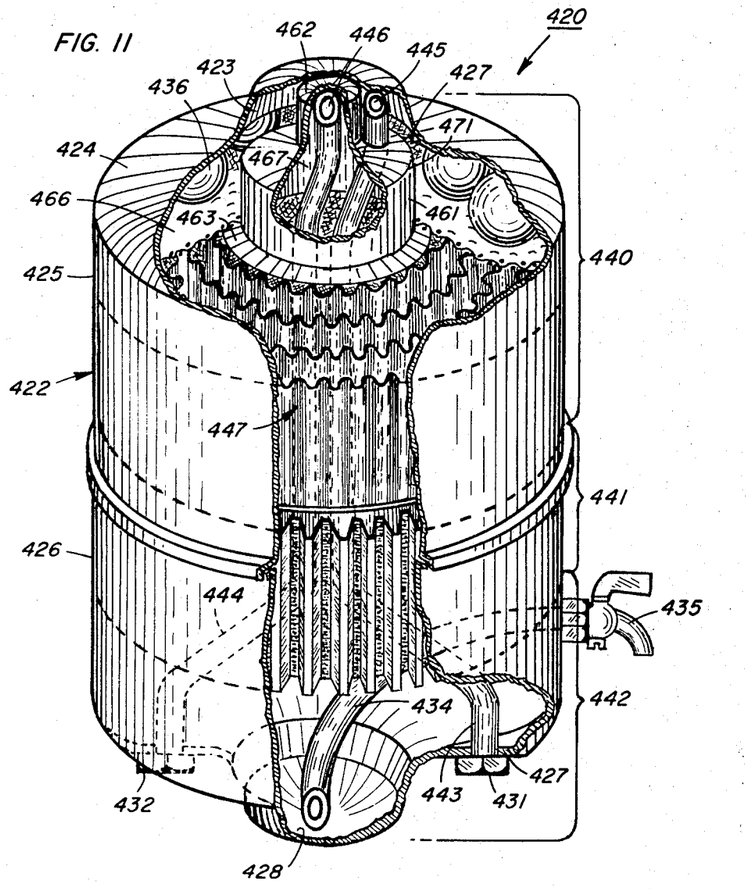
FIG. 11 is a front elevational perspective view, partly cut away, of yet another embodiment of apparatus according to the present invention.

Finally, referring to FIG. 11 there is shown another embodiment of a fluid purifier according to the present invention, designated generally by reference numeral 420. Structured similarly to the embodiments of FIGS. 6 and 7, purifier 420 includes a housing 422 comprising a top 424, an upper body portion 425, a lower body portion 426 and a bottom plate 427. Top 424 is provided with a centrally disposed inverted, cup-shaped recess to define an antidrainback chamber 423 such as discussed before, and bottom plate 427 is provided with a cup-shaped well 428 for receiving the collecting sludge for discharge.

An oil inlet connection 431 is provided for connecting a line from the engine to be served (not shown) to inlet oil line 443. Inlet line 443 extends upwardly through sludge sump 442, sedimentation area 441 and sweep chamber 440 into the anti-drainback chamber where it passes through a flow separator cup 461 to terminate in inlet orifice 445. Similarly to the embodiment of FIGS. 1–3, inlet orifice 445 is positioned so as to direct the flow of incoming oil tangentially with respect to the inner cylindrical surface of anti-drainback chamber 423.

An oil outlet connection 432 is provided for connecting a line from the engine to be served (not shown) to outlet oil line 444. Outlet line 444 extends upwardly through sludge sump 442, sedimentation area 441 and sweep chamber 440, to the underside of a cylindrical cap 462 formed on the top surface of separator cup 461. As with respect to the prior embodiments, an outlet opening 446 is provided on outlet line 444 at the geometric center of the purifier.

Mounted in sedimentation area 441 is a foraminous partition 451 which may be of honeycomb or other suitable structure so as to provide relatively deep foramina. Above foraminous partition 451 is a baffle element 447 which will be discussed hereinafter in greater detail. Mounted centrally above baffle element 447 is a flow separator cup 461 which is generally cylindrical with a centrally disposed cylindrical cap 462 for accommodating outlet line 444. An outwardly extending flange 463 is formed around the lower edge of separator cup 461, which flange 463 is for supporting and securing the wire race 465 for magnesium balls 436. As noted above with respect to the embodiments of FIGS. 6 and 7, flow separator cup 461 divides sweep chamber 440 into an outer chamber 466 and an inner chamber 467.

A sludge drain line 434 is provided from the sludge well 428 to a bibcock 435 mounted on lower body portion 426. Drain line 434 and bibcock 435 are for removing sludge in the same manner as discussed above with respect to the embodiments of FIGS. 1–4.

There are two significant structural developments in the embodiment of FIG. 11 which clearly distinguish this embodiment from those of FIGS. 6 and 7. Initially, separator cup 461 is generally cylindrical and is positioned within anti-drain back chamber 423 in such a manner as to define a narrow slit 470 between the upper edge 471 of separator cup 461 and the inner edge 472 between the anti-drain back chamber 423 and housing top 424. Narrow slit 470 causes the swirling oil to be discharged from anti-drain back chamber 423 in the form of a downwardly directed, diverging cone. The effect of this cone-shaped discharge of oil into the outer chamber 466 of sweep chamber 440 as compared with the streamline discharge disclosed with respect to the prior embodiments, is to increase the amount of oil which is moving in laminar flow, thus increasing the laminar flow separating forces and the efficiency of separation of coarse contaminants as described above in more detail.

The second significant structural development relates to the structure of the baffle element 447. As can be seen in FIG. 11, baffle element 447 comprises a spiral winding of corrugated material extending from the inner surface of upper housing 425 to substantially the center of the purifier. The baffle element 447 is positioned within the upper body portion 425 so that the whirling of the oil will cause the oil to be displaced radially inwardly to be ultimately brought upwardly into inner chamber 467 of separator cup 461 and discharged through oil outlet line 444. Thus, the general flow of the oil through the purifier of FIG. 12 is in through inlet line 443, tangentially within anti-drain back chamber 423 to establish a swirling flow, laminarly out of slit 470 into outer chamber 466 of the sweep chamber 440, spirally within baffle element 447 and circularly up through inner chamber 467 and separator cup 461 to be returned to the engine through outlet line 444.

The purification achieved by the embodiment of FIG. 11 is extremely effective. Coarse contaminants and water are separated by the centrifugal forces caused by the whirling flow, by the laminar forces caused by the conical laminar flow, by gravity, and by the separating effect of the laminar flow and the accompanying eddy currents within baffle element 447 caused by the flow of oil through the spiral path and past the corrugated walls. Further, the separation of ionized colloids is enhanced by the tremendous amount of attractor area presented by the foraminous partition 451 and the spiral baffle element 447.

In the manner discussed with respect to FIGS. 6 and 7, acid neutralization is very efficient because of the magnesium ball construction and the fact that the ball surfaces are being cleaned at all times during operation and therefore operating at peak reaction efficiency.

It is also of significance with respect to all of the above-described embodiments, that purification continues both when the engine is in operation and when it is idle. More specifically, when a serviced engine is not in operation and oil is not circulating through the purifiers of this invention, the ionized colloidal contaminants are bonded to the attractor surfaces on a continuing basis since such ionized colloidal contaminants are caused to remain in motion by the well-known Brownian movement. Thus, by providing as much attractor surface within the purifier as possible, the likelihood that ionized colloids will bond to the attractors for ultimate coalescense and sedimentation is increased and therewith the efficiency of the purification is increased. In this regard, fluid capacity of purifiers according to the present invention may be virtually any amount. However, those tested have held between ⅓ and ½ of the crankcase capacity and have been found to be quite satisfactory.

As a general matter, the components of the purifier may be made of virtually any material which is structurally sound, and where required, can act as a satisfactory attractor material for the ionized colloids. It has been found that manufacturing the entire structure of steel, with the exception of the magnesium sleeve or balls, is fully satisfactory.

It is also to be recognized that the elimination of sludge as described above, i.e. by periodic draining of oil and sludge through the bibcock, is not necessarily the only way to accomplish the sludge removal. It is also within the scope of this disclosure to provide a replaceable filter in line with the sludge sump discharge drain line so as to obviate the necessity of replacing the small amounts of oil which are lost during sludge sump draining. It has been found, however, that periodic draining is fully satisfactory and when properly carried out, results in the complete elimination of abrasive and reactive dispersed phase contaminants from the continuous phase oil.

Although the foregoing detailed description has been directed to apparatus wherein laminar flow is combined with whirling flow to separate coarse contaminants from a continuous phase liquid it is to be recognized that a solely laminar flow may, under certain conditions, be satisfactory to separate the coarse contaminants. It has been found that the combined whirling and laminar flow is much more efficient than solely laminar flow, however laminar flow alone is capable of accomplishing satisfactory separation. Accordingly, if conditions warranted, the outlet orifices of a liquid separator could be directed other than tangentially with respect to the inner housing surface. Although such an arrangement would not be operationally equivalent to the disclosed embodiments, it would constitute a novel use of a laminar flow condition for separating dispersed phase coarse contaminants from a continuous phase liquid.

As has become evident from a consideration of the foregoing detailed description, the fluid purifier and method of purification according to the present invention represent a tremendous advance in the art of fluid purification. With respect to motor vehicle uses alone, this invention will enable operating costs to be reduced by millions of dollars annually.

Manifestly, many modifications and adaptations may be made in the present invention without departing from the spirit and scope thereof.

What is claimed is:

1. Apparatus for separating dispersed phase contaminants from a continuous phase liquid, said dispersed phase contaminants including coarse contaminants, colloidal contaminants and ionized contaminants, said apparatus comprising:

a generally cylindrical housing having a generally vertically extending longitudinal axis;

a foraminous partition mounted substantially longitudinally centrally within said housing, said foraminous partition comprising substantially non-porous material shaped to define a plurality of longitudinally extending foramina, said foraminous partition cooperating with the longitudinally upper portion of said housing to define a sweep chamber and with the longitudinally lower portion of said housing to define a sludge sump;

inlet means mounted in said housing for introducing contaminated liquid into said sweep chamber, said inlet means disposed so as to establish a laminar, whirling flow of liquid within said sweep chamber to generate forces for displacing said coarse contaminants generally outwardly and downwardly within said sweep chamber to separate said coarse contaminants from said continuous phase liquid;

baffle means mounted in said sweep chamber, said baffle means positioned longitudinally upwardly of said foraminous partition so as to extend into said whirling flow of liquid, said baffle means defining impingement surfaces for said coarse contaminants and said colloidal contaminants to facilitate the separation and sedimentation thereof from said liquid, and said baffle means for defining a large attractor surface to facilitate the separating of said ionized contaminants from said continuous phase liquid by electrostatic bonding;

said sludge sump for receiving said contaminants after separation; and outlet means mounted in said housing generally centrally of said sweep chamber for removing said continuous phase liquid after separation of said dispersed phase contaminants.

2. Apparatus as claimed in claim 1 wherein said foraminous partition is a honeycomb-shaped partition oriented with the foramina extending vertically.

3. Apparatus as claimed in claim 1 wherein said baffle means comprises a plurality of substantially arcuately disposed prongs extending longitudinally upwardly at least partially into said sweep chamber from said foraminous partition.

4. Apparatus as claimed in claim 1 wherein said housing includes an outer wall section and a top, said top including a centrally disposed cup-shaped recess, and wherein said cup-shaped element cooperates with said centrally disposed cup-shaped recess to define an annular slit, said inlet means disposed to discharge said contaminated liquid into said outer chamber through said annular slit.

5. Apparatus as claimed in claim 1 and further including:

a cup-shaped element mounted in said sweep chamber longitudinally upwardly of said baffle means, said cup-shaped element for dividing at least a portion of said sweep chamber into an inner chamber and an outer chamber, and wherein said inlet means is disposed such as to introduce contaminated liquid into said outer chamber and said outlet means is disposed such as to remove said continuous phase liquid from said inner chamber.

6. Apparatus as claimed in claim 5 and further including an annular screen extending from the lower periphery of said cup-shaped element to the inner surface of said housing, said annular screen for defining a race for at least one reactant member made up of material for chemically reacting with contaminants in said contaminated liquid, said reactant member being loosely confined within said housing on said race for movement with said laminar whirling flow of liquid in said outer chamber.

7. Apparatus as claimed in claim 1 wherein said baffle means comprises a generally spirally wound member.

8. Apparatus as claimed in claim 7 wherein said spirally wound member is a corrugated member.

9. In an apparatus for separating dispersed phase contaminants from a continuous phase liquid, said apparatus including a housing, inlet means and outlet means in said housing, partition means for separating within said housing a sweep chamber and a sludge sump; and improvement wherein:
said inlet means comprises an inlet tube extending from a wall of said housing through said sludge sump into said sweep chamber;
said outlet means comprises an outlet tube extending from a wall of said housing through said sludge sump into said sweep chamber; and
the portions of said inlet line and said outlet line disposed in said housing for defining heat exchanger means for liquid in said housing, and also for defining support means for said partition means.

10. In an apparatus for separating dispersed phase contaminants from a continuous phase liquid, said apparatus including means for establishing a whirling flow in said continuous phase liquid, said continuous phase liquid containing emulsified acids therein, the improvement comprising:
means for neutralizing said emulsified acids in said continuous phase liquid, said means including at least one movable member formed of material for reacting with and neutralizing said emulsified acids, said movable member being loosely confined within said apparatus for free movement within said whirling flow of said continuous phase liquid.

11. The improvement as claimed in claim 10 wherein said movable means for neutralizing comprises at least one ball-shaped member.

12. A liquid cleaning apparatus having a housing, said housing having a liquid inlet port and a liquid outlet port therein, said housing also having internally at least one essentially medial, horizontal and fully cross-sectional foraminous partition, the foramina being essentially vertical therein, said partition separating an upper sweep chamber and a lower sludge sump within said housing, said housing also having a draining means positioned therein so as to drain said sump, said sweep chamber having a continuous flow-tube therein, said tube joining said inlet port and said outlet port in said housing, said tubing having a tight turn such as a helical bend therein, said tube having on its outside wall at said turn at least one ooze-port therethrough, said port being so positioned as to allow part of said internal liquid flow to escape into said sweep chamber, said tube also having at a point near the upper horizontal, vertical center of said sweep chamber a reentry orifice therein through which orifice said original escaped fluid is forced to return to join said flow-stream in said continuous flow-tube after said escaped liquid has circulated at a slower rate as compared to the entering rate, thus with a longer dwell time in said sweep chamber, said continuous flow-tube also having a flow resistor between said ooze-port and said reentry orifice, said resistor being so positioned and deposed to regulate the amount of fluid escaping from said port, thus establishing two predetermined streams in said fluid, one continuing in said flow-tube and the other flowing about said sweep chamber and subsequently reentering said flow-tube.

13. The apparatus of claim 12 in which said flow-tube is sufficiently elongated to be formed into a grid-like heating element within said sump to heat the liquid contained therein when said entering fluid is hot.

14. The apparatus of claim 12 in which said flow-tube is so formed and positioned to anchor said foraminous partition in its medial position.

15. The apparatus of claim 12 in which said foraminous partition is made of stainless steel.

16. The apparatus of claim 12 in which said foraminous partition is treated with a coating material such as Teflon.

References Cited

UNITED STATES PATENTS

| | | | |
|---|---|---|---|
| 2,390,841 | 12/1945 | Longden | 210—304 |
| 2,785,805 | 3/1957 | Hough | 210—501 X |
| 293,562 | 2/1884 | Cady | 210—181 X |
| 955,787 | 4/1910 | Freeman | 210—304 |
| 1,818,476 | 8/1931 | Green | 210—512 |
| 2,207,399 | 7/1940 | Gaertner | 210—304 X |
| 2,214,248 | 9/1940 | Hawley | 210—51 |
| 2,767,847 | 10/1956 | Russell et al. | 210—513 |
| 2,816,662 | 12/1957 | Hylen | 210—304 X |
| 2,848,995 | 8/1958 | Ryan | 210—501 X |
| 2,909,284 | 10/1959 | Watkins | 210—501 X |
| 2,983,384 | 5/1961 | Winslow | 210—304 X |
| 3,339,740 | 9/1967 | Starzyk | 210—521 X |

FOREIGN PATENTS 23,084  11/1930  Netherlands.

REUBEN FRIEDMAN, *Primary Examiner.*

FRANK A. SPEAR, JR., *Assistant Examiner.*

U.S. Cl. X.R.

210—187, 206, 304, 320, 512, 513, 521

UNITED STATES PATENT OFFICE
CERTIFICATE OF CORRECTION

Patent No. 3,450,264  
June 17, 1969

Paul J. Graybill

It is certified that error appears in the above identified patent and that said Letters Patent are hereby corrected as shown below:

Column 3, line 1, after "delicate" insert a comma; line 9, after "viz." insert -- they have been ineffective in separating relatively small contaminants; and --. Column 8, line 58, "withe" should read -- with --.

Signed and sealed this 17th day of March 1970.

(SEAL)  
Attest:

Edward M. Fletcher, Jr.  
Attesting Officer

WILLIAM E. SCHUYLER, JR.  
Commissioner of Patents